INVENTOR
JEAN FRANÇOIS MARCHAND
BY Frank R. Jeifari
AGENT

United States Patent Office 3,105,960

Patented Oct. 1, 1963

3,105,960
DYNAMIC MAGNETIC STORAGE CIRCUIT

Jean François Marchand, Eindhoven, Netherlands, assignor to North American Philips Company, Inc., New York, N.Y., a corporation of Delaware Filed May 19, 1958, Ser. No. 736,120
Claims priority, application Netherlands June 8, 1957
4 Claims. (Cl. 340—174)

The present invention relates to dynamic magnetic storage circuit arrangements. Such circuit arrangements may, for example, be used in electronic computers or in automatic telephone systems. Magnetic storage circuits of the dynamic type have the advantage of allowing at all times an output voltage to be taken from them, thus permitting a further arrangement, for example a gate circuit, to be directly controlled by the storage circuit.

Known storage circuits of this type comprise, in general, a core of low-remanent magnetic material carrying a winding which is connected, in series with a capacitor, to a generator. Such a circuit is capable of oscillating in two different states of oscillation. The conventional circuit suffers from a disadvantage in that the generator cannot be disconnected, since the information is lost upon disconnection. Known static magnetic storage circuits equipped with cores of magnetic material having a rectangular hysteresis loop suffer from a disadvantage in that an output voltage cannot always be derived from them and in that the information may be destroyed on reading out.

The present invention has for its primary object the mitigation of these disadvantages. In accordance with the invention, the dynamic magnetic storage circuit comprises a generator circuit for alternately supplying pulses of opposite polarity to a parallel-combination of two windings arranged on two cores of magnetic material having a rectangular hysteresis loop. Further, control means are provided for making the cores assume either a unidirectional remanence condition or an oppositely directed remanence condition. As used herein, the term "unidirectional remanence condition" is to be understood to mean a state of remanence which the cores tend to assume when a pulse is supplied to the parallel-combination of said windings. In the storage circuit arrangement according to the invention, the pulses from the generator have such value that the two cores change their state of remanence under the control of these pulses if the remanences are unidirectional, and do not change their state of remanence if the remanences are oppositely directed. Further, provision is made of means for deriving output pulses from the storage circuit depending on the changing of the states of remanence.

Figure 1:
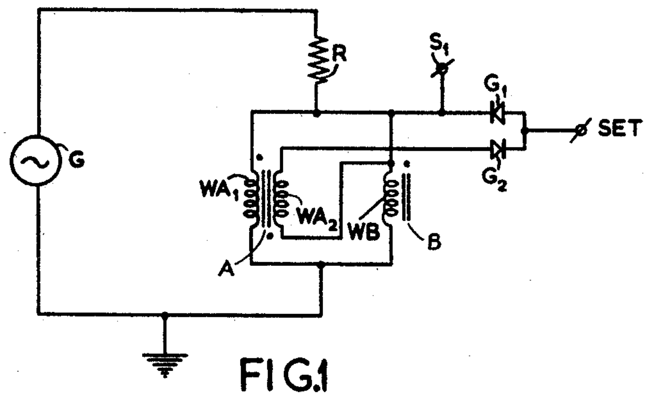
Figure 2:
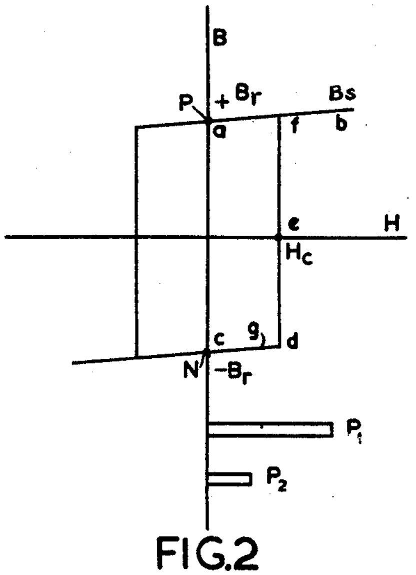

In order that the invention may be readily carried into effect, an example will now be described in detail with reference to the accompanying drawing. The storage circuit arrangement shown in FIG. 1 comprises two cores A and B composed of magnetic material, the hysteresis loop of which is at least substantially rectangular, as shown by the idealized hysteresis loop shown in FIG. 2, which illustrates the relationship existing between the magnetic induction B and the magnetic field strength H of the material; the field strength H is proportional to the current through the winding on the core. The core is adapted to assume two opposite magnetic conditions P and N. In the absence of current through the winding on the core, the magnetic induction corresponds to $+Br$ or $-Br$. If the core is in the condition P the material is driven further into magnetic saturation when a positive pulse is supplied to the winding the magnetization follows the branch *a-b-a* of the hysteresis loop. Since the saturation induction $Bs$ differs only slightly from the value $Br$, the effective permeability during this process substantially corresponds to unity, so that the impedance of the winding on the core has a comparatively low value, substantially corresponding to the direct-current resistance. On termination of the pulse, the core reassumes the condition $+Br$. If the core is in the condition N, it can be changed over to the condition P by applying to the winding on the core a pulse $P_1$ of such a value as to exceed the critical field strength $Hc$. The magnetization then follows the branch *c-g-d-e-f-b-f-a* of the hysteresis curve. Since this involves a rather considerable variation of the magnetic induction B, the effective permeability is comparatively high, and therefore the winding on the core has a comparatively high impedance. If the core is in the condition $-Br$ and a rather weak pulse $P_2$ is applied so as not to exceed the critical field strength $Hc$, the magnetization follows the branch *c-g-c* of the hysteresis loop, the inductance B then changing only slightly and the winding of the core having only a low impedance.

The windings $WA_1$ and WB on the cores A and B respectively are connected in parallel with each other and through a resistor R to the generator G, the frequency of which may be, for example, 1 megacycle. The internal resistance of the generator G and/or the resistance R have such a value that the magnitude of the current pulses from the generator G depends only slightly upon the impedance of the windings $WA_1$ and WB. The dots at the windings $WA_1$, $WA_2$ and WB denote the ends of the windings to which the positive current has to be supplied in order to drive the cores into the condition of positive magnetization P.

This circuit arrangement operates as follows:

For recording for example, the digit 1, the cores are brought into a condition of unidirectional magnetization by supplying, through a terminal SET and the rectifier $G_1$, a strong positive pulse to the windings $WA_1$ and WB sufficient to make the two cores assume the condition P. These control pulses exceed in amplitude the pulses supplied by the generator G to the parallel-combination of the windings $WA_1$ and WB. If the following pulse from the generator G is positive, the cores remain in this condition. As a result of the next negative pulse from the generator G the two cores pass over to the condition N. The impedances of the windings $WA_1$ and WB are comparatively high but substantially equal, hence the pulse from the generator G divides equally between the two windings, the pulse having such a value that the critical field strength $Hc$ is exceeded in the two cores. Upon the following positive pulse from the generator G, the two cores reassume the condition P; this sequence continues with the application of further pulses from the generator. Since, as stated before, the impedances of the windings $WA_1$ and WB are comparatively high during this process, comparatively strong output pulses appear at the terminal $S_1$, this being characteristic of recording the digit 1. These pulses permit, if required after rectification, further circuit arrangements to be controlled, for example gate circuits or the like.

For recording the digit 0 the cores may be caused to assume relatively opposite states of magnetization, for example the core A the state P and the core B the state N, by supplying a sufficiently strong negative control pulse to the windings $WA_2$ and WB via terminal SET and rectifier $G_2$. If the following pulse from the generator G is positive, the core A is further driven into positive saturation, so that this core remains in the state P. As stated before, the impedance of the winding $WA_1$ then is comparatively low, hence the winding WB is substantially short-circuited and the current through the winding WB cannot assume such a value that the core B passes over to the state P. As a matter of fact, if the current through the winding WB were to assume such a value as to substantially attain the field strength $Hc$ in the core B, the impedance of the winding WB rises instantly, as a result of which the current through this winding is limited to this value and the remainder of the current from the generator passes through the winding $WA_1$. Hence, the cores A and B remain in the conditions P and N respectively. Upon the following negative pulse from the generator G, the winding WB substantially short-circuits the winding $WA_1$ so that in this case also the cores remain in the assumed state of magnetization. Consequently, when recording the digit 0, the cores A and B do not change their state of magnetization, hence one of the windings $WA_1$ or WB always has a low impedance so that only pulse voltages of low amplitude are set up at the terminal $S_1$, which characterizes the recording of the digit 0. If desired, output pulses may alternatively be derived from an auxiliary winding on one of the cores or from a resistor, for example the resistor R, connected in series with the windings $WA_1$ and WB. When the digit 1 is recorded, comparatively weak pulse voltages will pass through the resistor R, since the impedances of the windings $WA_1$ and WB are comparatively high, and when recording the digit 0 comparatively strong pulse voltages will be set up, since these impedances are then low.

An advantage of the circuit arrangement as described is that the generator G can be disconnected without destroying the recorded information, which may be of practical importance for economizing current. The cores A and B then remain in a unidirectional state of remanence on recording the digit 1, or in an oppositely directed state of remanence on recording the digit 0. The generator may then be reconnected in an arbitrary phase, as stated above.

While the invention has been described with respect to a specific embodiment, it is to be understood that various modifications thereof will readily occur to those skilled in the art, the inventive concept being delimited in the appended claims.

What is claimed is:

1. A dynamic magnetic storage circuit arrangement comprising two cores composed of a magnetic material having a rectangular hysteresis loop, windings coupled to said cores, said windings being connected in parallel across an alternating current generator, which alternately supplies current pulses having polarities opposite to each other thereto, means for causing said cores to assume a unidirectional state of remanence or an oppositely directed state of remanence, said current pulses causing the two cores to change their states of remanence if they are unidirectional and to remain in their states of remanence if they are oppositely directed, and output means for deriving output pulses from the storage circuit in accordance with the remanence condition of the cores.

2. A dynamic magnetic storage circuit arrangement comprising first and second cores composed of a magnetic material having a rectangular hysteresis loop, first windings coupled to said first and second cores respectively, a second winding coupled to said first core, said first windings being wound on said cores in the same direction, said second winding being wound oppositely to the sense of said first windings, first unidirectional means for applying a first pulse indicative of a code to said first windings, said first pulse causing the cores to assume a unidirectional state of remanence, a second unidirectional means for applying a second pulse indicative of a code to said second winding and one of said first windings, said second pulse causing the cores to assume an oppositely directed state of remanence, means for causing the two cores to change their states of remanence if they are unidirectional and to remain in their states of remanence if they are oppositely directed, and output means for deriving an output signal from the storage circuit in accordance with the remanence condition of the cores.

3. A storage circuit as claimed in claim 1, further comprising a resistor connected in series with the parallel combination of the windings, said output means being coupled to said resistor.

4. A dynamic magnetic storage circuit arrangement comprising a variable impedance network including two cores composed of a magnetic material having a substantially rectangular hysteresis loop, at least a first winding coupled to one of said cores and a second winding coupled to the other of said cores, the respective ends of said windings being connected together by a direct current conductive connection, an alternating current generator connected across said windings, set means coacting with both of said windings for causing each core to assume a particular state of remanence, and output means coupled to said windings for deriving an output signal having an amplitude dependent on whether said cores assumed the same state or different states of remanence.

References Cited in the file of this patent

UNITED STATES PATENTS

| | | |
|---|---|---|
| 2,734,182 | Rajchman | Feb. 7, 1956 |
| 2,775,713 | Isborn | Dec. 25, 1956 |
| 2,777,098 | Duffing | Jan. 8, 1957 |
| 2,872,663 | Kelner | Feb. 3, 1959 |
| 2,904,780 | Meyerhoff | Sept. 15, 1959 |
| 3,005,976 | Anderson | Oct. 24, 1961 |